United States Patent
Beckman et al.

(10) Patent No.: US 11,736,172 B2
(45) Date of Patent: Aug. 22, 2023

(54) SIMULTANEOUS UPLINK TRANSMISSIONS ASSOCIATED WITH MULTIPLE SUBSCRIPTIONS

(71) Applicant: QUALCOMM Incorporated, San Diego, CA (US)

(72) Inventors: James Beckman, La Jolla, CA (US); Reza Shahidi, San Diego, CA (US); Cheol Hee Park, San Diego, CA (US); Francis Ming-Meng Ngai, Louisville, CO (US); Aamod Khandekar, San Diego, CA (US); Krishna Chaitanya Mukkera, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/654,340

(22) Filed: Mar. 10, 2022

(65) Prior Publication Data
US 2022/0294510 A1    Sep. 15, 2022

Related U.S. Application Data

(60) Provisional application No. 63/159,863, filed on Mar. 11, 2021.

(51) Int. Cl.
*H04B 7/0413* (2017.01)
*H04B 7/06* (2006.01)
*H04W 72/1268* (2023.01)
*H04L 5/14* (2006.01)
*H04W 8/18* (2009.01)

(52) U.S. Cl.
CPC .............. *H04B 7/0689* (2013.01); *H04L 5/14* (2013.01); *H04W 8/18* (2013.01); *H04W 72/1268* (2013.01); *H04B 7/0413* (2013.01)

(58) Field of Classification Search
CPC ...... H04W 8/18; H04W 72/1268; H04L 5/14; H04B 7/0413; H04B 7/0689
See application file for complete search history.

(56) References Cited

U.S. PATENT DOCUMENTS

2021/0006275 A1*   1/2021  Langer ................. H04B 1/0475

* cited by examiner

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a user equipment (UE) may perform, to a first base station and via a first radio frequency (RF) chain associated with a first subscription, a first uplink transmission based at least in part on one or more of an uplink carrier aggregation capability of the UE or an uplink multiple-input multiple-output (MIMO) capability of the UE. The UE may perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE. Numerous other aspects are described.

29 Claims, 13 Drawing Sheets

1200 ⟶

1210 — Perform, to a first base station and via a first radio frequency (RF) chain associated with a first subscription, a first uplink transmission based at least in part on one or more of an uplink carrier aggregation capability of the UE or an uplink multiple-input multiple-output (MIMO) capability of the UE 1220 — Perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE

SIMULTANEOUS UPLINK TRANSMISSIONS ASSOCIATED WITH MULTIPLE SUBSCRIPTIONS

CROSS-REFERENCE TO RELATED APPLICATION

This Patent application claims priority to U.S. Provisional Patent Application No. 63/159,863, filed on Mar. 11, 2021, entitled "SIMULTANEOUS UPLINK TRANSMISSIONS ASSOCIATED WITH MULTIPLE SUBSCRIPTIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for simultaneous uplink transmissions associated with multiple subscriptions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes performing, to a first base station and via a first radio frequency (RF) chain associated with a first subscription, a first uplink transmission based at least in part on one or more of an uplink carrier aggregation capability of the UE or an uplink MIMO capability of the UE; and performing, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

In some aspects, a UE for wireless communication includes a memory and one or more processors, coupled to the memory, configured to: perform, to a first base station and via a first RF chain associated with a first subscription, a first uplink transmission based at least in part on one or more of an uplink carrier aggregation capability of the UE or an uplink MIMO capability of the UE; and perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

In some aspects, a non-transitory computer-readable medium storing a set of instructions for wireless communication includes one or more instructions that, when executed by one or more processors of a UE, cause the UE to: perform, to a first base station and via a first RF chain associated with a first subscription based at least in part on one or more of an uplink carrier aggregation capability of the UE or an uplink MIMO capability of the UE, a first uplink transmission; and perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

In some aspects, an apparatus for wireless communication includes means for performing, to a first base station and via a first RF chain associated with a first subscription, a first uplink transmission based at least in part on one or more of an uplink carrier aggregation capability of the apparatus or an uplink MIMO capability of the apparatus; and means for performing, to the first base station or to a second base station, and via a second RF chain associated with a second subscription and configured to operate simultaneously with the first RF chain, a second uplink transmission based at least in part on one or more of the uplink carrier aggregation capability of the apparatus or the uplink MIMO capability of the apparatus.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
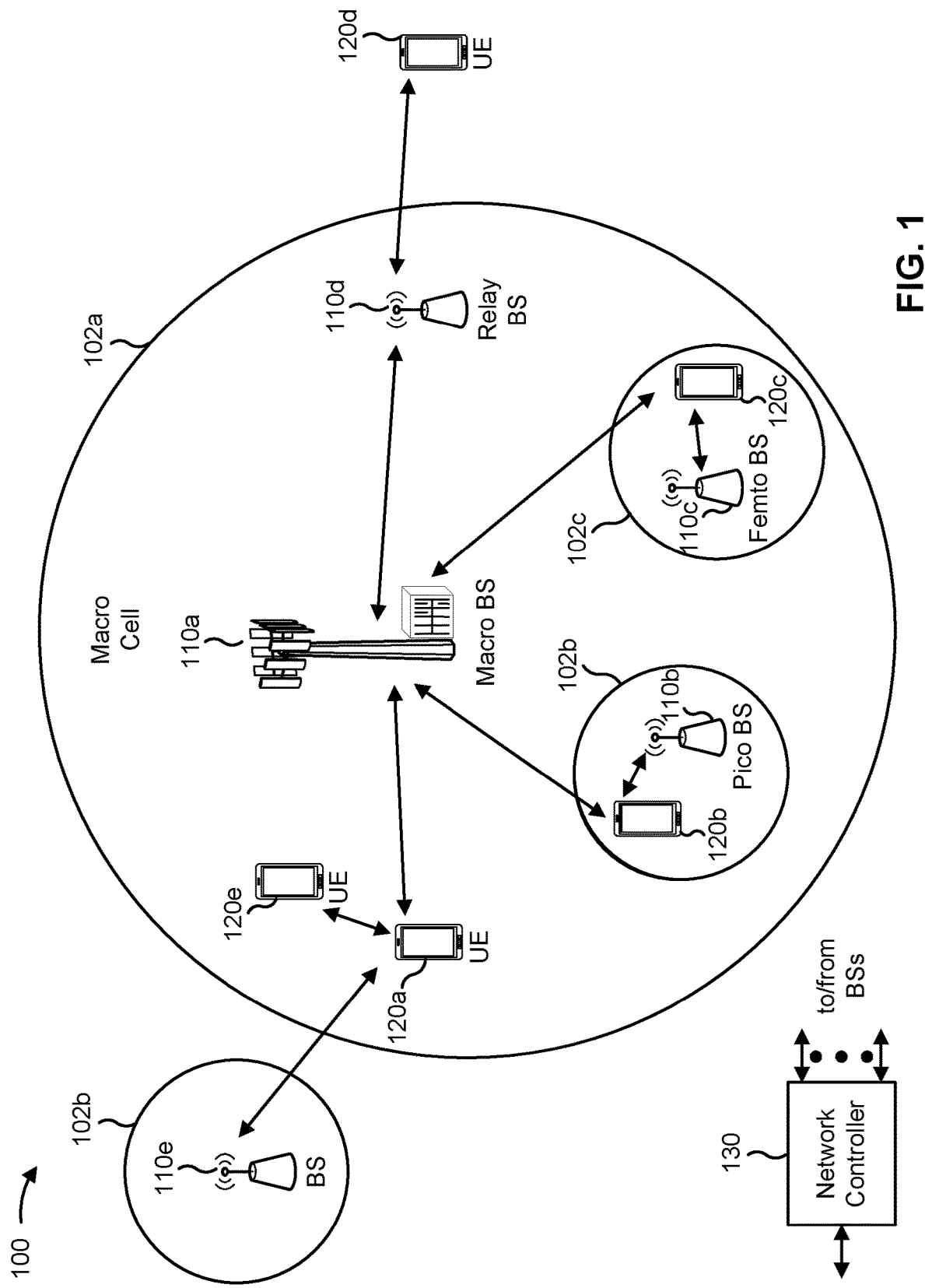
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
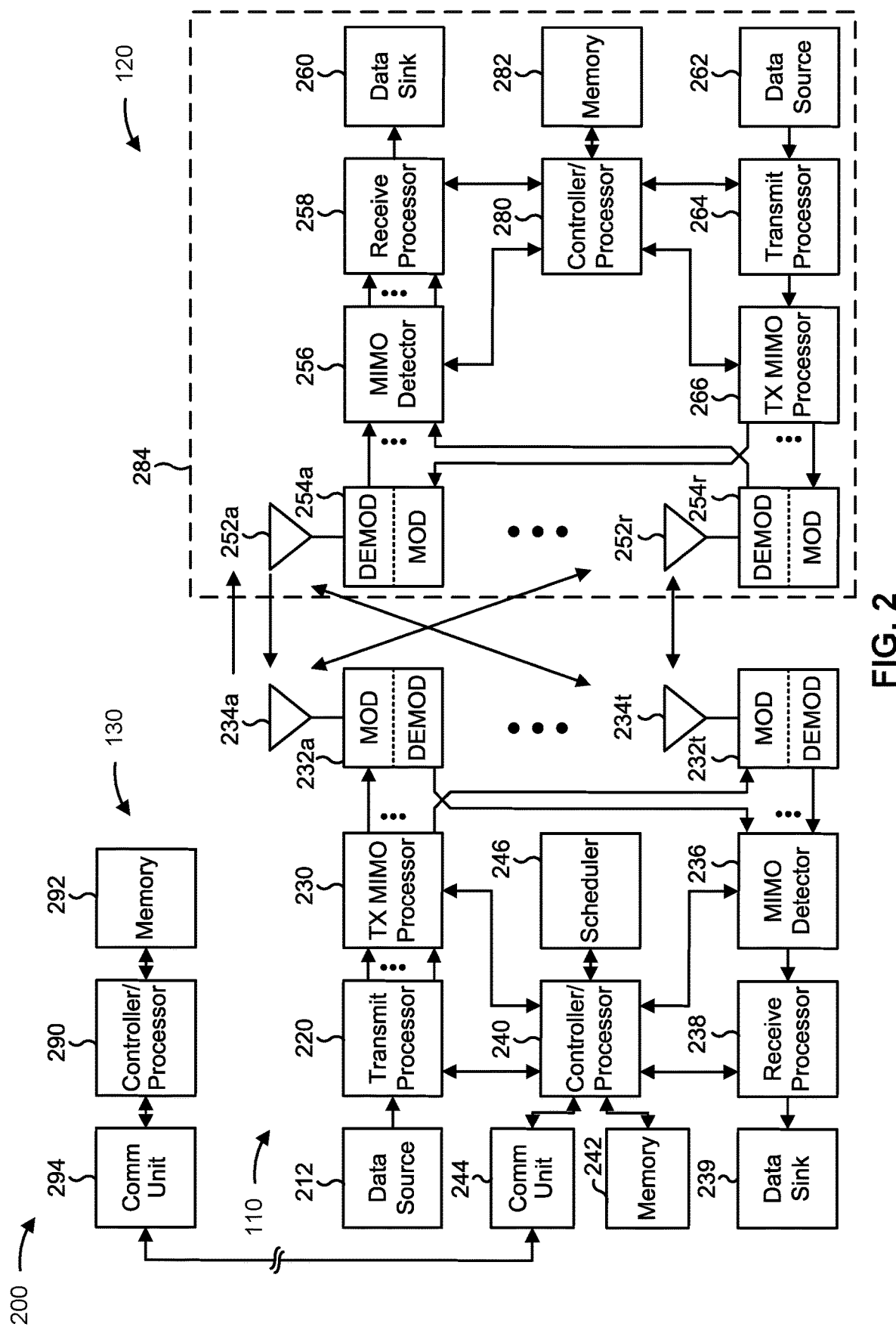
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the base station 110, the controller/processor 280 of the UE 120, and/or any other component(s) of FIG. 2 may perform one or more techniques associated with simultaneous uplink transmissions associated with multiple subscriptions, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for performing, to a first base station and via a first RF chain associated with a first subscription, a first uplink transmission based at least in part on one or more of an uplink carrier aggregation capability of the UE or an uplink MIMO capability of the UE; and/or means for performing, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, from a first base station via the first RF chain, a first physical downlink control channel (PDCCH) grant associated with a first priority, wherein the first PDCCH grant is associated with the first uplink transmission; means for receiving, from the first base station or a second base station and via the second RF chain, a second PDCCH grant associated with a second priority that is higher than the first priority, wherein the second PDCCH grant is associated with the second uplink transmission; and/or means for reducing a power level associated with the first uplink transmission and increasing a power level associated with the second uplink transmission based at least in part on the second priority being higher than the first priority.

In some aspects, the UE includes means for assigning a first amplifier associated with the first RF chain to the first subscription and assigning a second amplifier associated with the second RF chain to the second subscription based at least in part on the first subscription and the second subscription not being at an edge of coverage.

In some aspects, the UE includes means for assigning a first amplifier associated with the first RF chain to the first subscription and assigning a second amplifier associated with the second RF chain to the second subscription based at least in part on an uplink transmit concurrency having a higher priority than maximizing an uplink power headroom.

In some aspects, the UE includes means for assigning a first amplifier associated with the first RF chain to the first subscription and assigning a second amplifier associated with the second RF chain to the second subscription based at least in part on a priority of the first subscription in relation to a priority of the second subscription, wherein the first amplifier is associated with a first maximum output power and the second amplifier is associated with a second maximum output power.

In some aspects, the UE includes means for assigning a first amplifier associated with the first RF chain and a second amplifier associated with the second RF chain to one of the first subscription or the second subscription for a period of time based at least in part on one or more of the first subscription or the second subscription being at an edge of coverage.

In some aspects, the UE includes means for assigning a first amplifier associated with the first RF chain and a second amplifier associated with the second RF chain to one of the first subscription or the second subscription for a period of time when maximizing an uplink power headroom has a higher priority than an uplink transmit concurrency.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE that supports dual subscriber identification module (SIM) dual-active (DSDA) may include two SIM cards that have the capability to operate in two separate networks. The two SIM cards may be associated with two separate subscriptions. For example, each SIM card may store network-specific information used to authenticate and identify subscribers on a specific network. A first SIM card may be associated with a first subscription, and a second SIM card may be associated with a second subscription. The first subscription may be associated with a first network operator, and the second subscription may be associated with a second network operator. The UE may have two RF chains that allow for dual uplink connections, such that the two separate subscriptions may support uplink at a same time. In other words, the UE may support "full concurrency," since the two RF chains may concurrently support the two separate subscriptions at the same time. The UE may orthogonalize operations between the two RF chains, such that transmissions associated with the first subscription may be simultaneous, or near simultaneous, to transmissions associated with the second subscription.

The UE may include a first RF chain associated with the first subscription. The first RF chain may perform uplink transmissions to a first base station. The UE may include a second RF chain associated with the second subscription. The second RF chain may perform uplink transmissions to a second base station. The first base station may be associated with a first network, and the second base station may be associated with a second network. In some cases, the first RF chain and the second RF chain may perform transmissions to a same base station in a network.

However, previous UE designs for supporting simultaneous uplink transmissions required specialized hardware and/or additional circuitry, which may increase a cost, complexity, and/or power consumption of the UE. Therefore, a full concurrency solution that utilizes existing UE hardware may be desirable, as leveraging the existing UE hardware to achieve simultaneous uplink transmissions for multiple subscriptions may reduce costs, complexity, and/or power consumption at the UE.

In various aspects of techniques and apparatuses described herein, a UE may perform, to a first base station and via a first RF chain associated with a first subscription, a first uplink transmission based at least in part on an uplink carrier aggregation capability of the UE and/or an uplink MIMO capability of the UE. The UE may perform, to the first base station or to a second base station, and via a second RF chain associated with a second subscription and configured to operate simultaneously with the first RF chain, a second uplink transmission based at least in part on the uplink carrier aggregation capability of the UE and/or the uplink MIMO capability of the UE. The uplink carrier aggregation capability may support one transmission per carrier and may be configured to provide one uplink transmission per subscription. The uplink carrier aggregation capability of the UE may be based at least in part on a baseband, and on the first RF chain and the second RF chain being provisioned for two or more uplink carriers. The baseband may provision a first uplink carrier for the first RF chain and a second uplink carrier for the second RF chain. The uplink MIMO capability may support two transmissions for one carrier and may be configured to provide one uplink transmission per subscription. Thus, the existing baseband of the UE that supports uplink carrier aggregation (e.g., one transmission per carrier) and/or uplink MIMO (e.g., two transmissions for one carrier) may be leveraged, such that existing hardware of the UE may be used to dedicate one transmission per subscription.

Further, leveraging an existing uplink carrier aggregation capability and/or an existing uplink MIMO capability of the UE for the purpose of performing simultaneous uplink transmissions for multiple subscriptions may improve on other implementation designs that incorporate new hardware to achieve the simultaneous uplink transmissions. In other words, the uplink carrier aggregation capability and/or the uplink MIMO capability of the UE may be repurposed to achieve the simultaneous uplink transmissions for multiple subscriptions.

Figure 3:
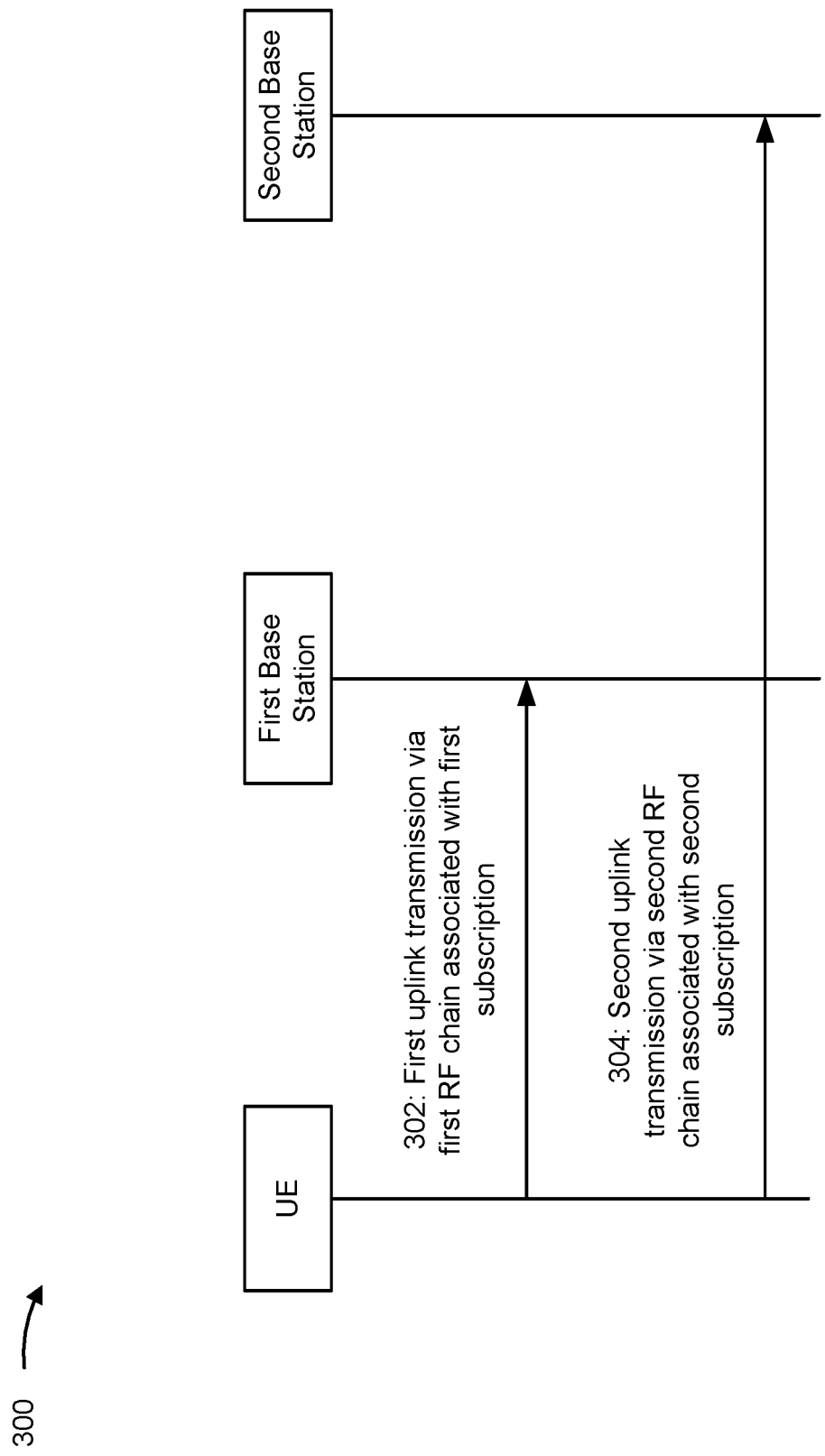
FIGS. 3-11 are diagrams illustrating examples of simultaneous uplink transmissions associated with multiple subscriptions, in accordance with the present disclosure.

FIG. 3 is a diagram illustrating an example 300 of simultaneous uplink transmissions associated with multiple subscriptions, in accordance with the present disclosure. As shown in FIG. 3, example 300 includes communication between a UE (e.g., UE 120), a first base station (e.g., base station 110*a*), and a second base station (e.g., base station 110*e*). In some aspects, the UE, the first base station, and the second base station may be included in a wireless network such as wireless network 100.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As shown by reference number 302, the UE may perform, to the first base station and via a first RF chain associated with a first subscription, a first uplink transmission based at least in part on one or more of an uplink carrier aggregation capability of the UE or an uplink MIMO capability of the UE. The first uplink transmission may be associated with a physical uplink shared channel (PUSCH) transmission.

As shown by reference number 304, the UE may perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE. The second uplink transmission may be associated with a PUSCH transmission. In some aspects, the first uplink transmission may at least partially overlap with the second uplink transmission.

In some aspects, the UE may perform the first uplink transmission and the second uplink transmission based at least in part on the uplink carrier aggregation capability of the UE. The uplink carrier aggregation capability may support one transmission per carrier and may be configured to provide one uplink transmission per subscription. In some aspects, the uplink carrier aggregation capability of the UE may be based at least in part on a baseband, and the first RF chain and the second RF chain, being provisioned for two or more uplink carriers. The baseband may provision a first uplink carrier for the first RF chain and a second uplink carrier for the second RF chain.

In some aspects, the UE may perform the first uplink transmission and the second uplink transmission based at least in part on the uplink MIMO capability of the UE. The uplink MIMO capability may support two transmissions for one carrier and may be configured to provide one uplink transmission per subscription.

In some aspects, the first base station may be associated with a first network and the second base station may be associated with a second network. In some aspects, the first subscription and the second subscription may be associated with a single band. In some aspects, the first subscription may be associated with a first band, and the second subscription may be associated with a second band.

In some aspects, the first uplink transmission may be based at least in part on frequency division duplexing (FDD), and the second uplink transmission may be based at least in part on FDD. In some aspects, the first uplink transmission may be based at least in part on FDD, and the second uplink transmission may be based at least in part on time division duplexing (TDD) (or vice versa). In some aspects, the first uplink transmission may be based at least in part on TDD, and the second uplink transmission may be based at least in part on TDD.

In some aspects, the UE may receive, from the first base station via the first RF chain, a first PDCCH grant associated with a first priority. The first PDCCH grant may be associated with the first uplink transmission. The UE may receive, from the first base station or the second base station and via the second RF chain, a second PDCCH grant associated with a second priority that is higher than the first priority. The second PDCCH grant may be associated with the second uplink transmission. The UE may reduce a power level associated with the first uplink transmission and increase a power level associated with the second uplink transmission based at least in part on the second priority being higher than the first priority. In some aspects, the UE may reduce the power level associated with the first uplink transmission on a per symbol basis.

In some aspects, the UE may assign a first amplifier associated with the first RF chain to the first subscription and assign a second amplifier associated with the second RF chain to the second subscription based at least in part on the first subscription and the second subscription not being at an edge of coverage, or based at least in part on an uplink transmit concurrency having a higher priority than maximizing an uplink power headroom.

In some aspects, the first UE may assign a first amplifier associated with the first RF chain to the first subscription and assign a second amplifier associated with the second RF chain to the second subscription based at least in part on a priority of the first subscription in relation to a priority of the second subscription. The first amplifier may be associated with a first maximum output power, and the second amplifier may be associated with a second maximum output power.

In some aspects, the UE may assign a first amplifier associated with the first RF chain and a second amplifier associated with the second RF chain to one of the first subscription or the second subscription for a period of time based at least in part on one or more of the first subscription or the second subscription being at an edge of coverage, or based at least in part on maximizing an uplink power headroom having a higher priority than an uplink transmit concurrency.

As indicated above, FIG. 3 is provided as an example. Other examples may differ from what is described with regard to FIG. 3.

Figure 4:
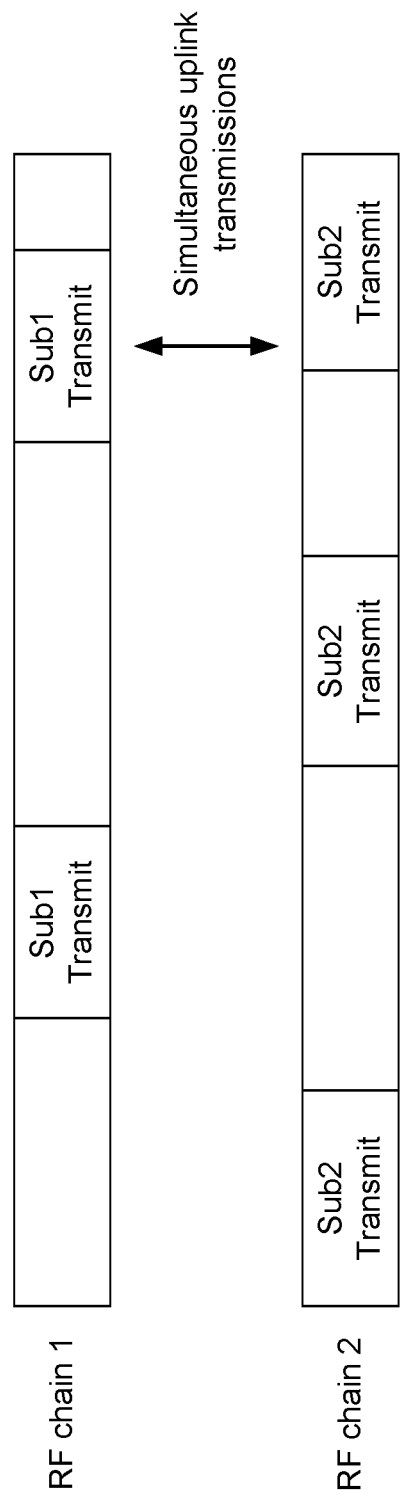

FIG. 4 is a diagram illustrating an example 400 of simultaneous uplink transmissions associated with multiple subscriptions, in accordance with the present disclosure.

As shown in FIG. 4, uplink transmissions associated with a first subscription (sub1) may be performed over a period of time. The first subscription may be associated with a first RF chain. Uplink transmissions associated with a second subscription (sub2) may be performed over the period of time. The second subscription may be associated with a second RF chain. In some cases, an uplink transmission associated with the first subscription may at least partially overlap in time with an uplink transmission associated with the second subscription. In this case, the uplink transmission associated with the first subscription and the uplink transmission associated with the second subscription may be concurrent uplink transmissions.

As indicated above, FIG. 4 is provided as an example. Other examples may differ from what is described with regard to FIG. 4.

Figure 5:
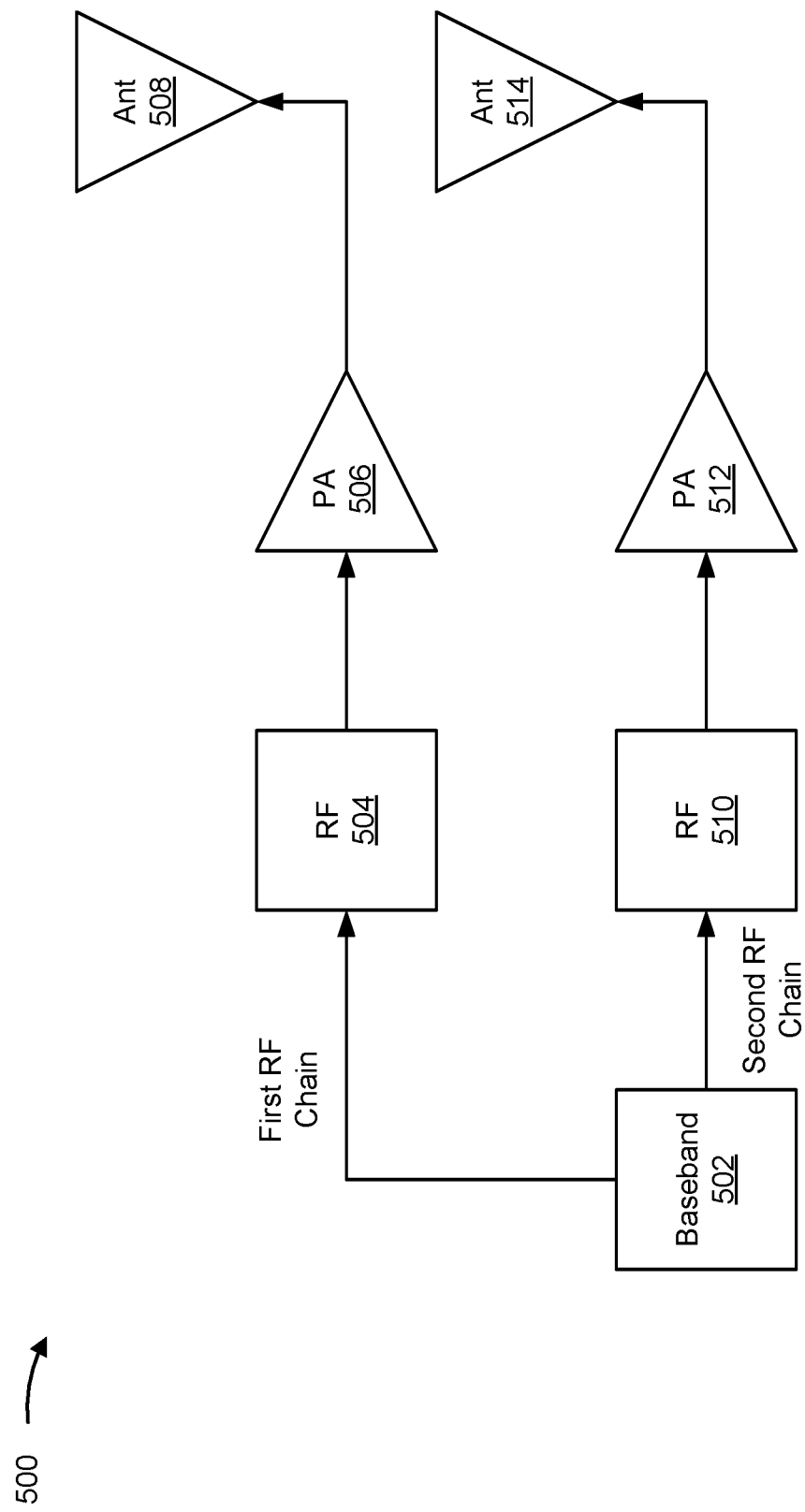

FIG. 5 is a diagram illustrating an example 500 of simultaneous uplink transmissions associated with multiple subscriptions, in accordance with the present disclosure.

As shown in FIG. 5, a UE may include a baseband component 502. The baseband component 502 may be communicatively coupled to a first RF chain. The first RF chain may include a plurality of components, such as RF components 504 and/or amplifiers 506 (e.g., power amplifiers, low-noise amplifiers). The first RF chain may be communicatively coupled to a first antenna 508. The baseband component 502 may be communicatively coupled to a second RF chain. The second RF chain may include a plurality of components, such as RF components 510 and/or amplifiers 512 (e.g., power amplifiers, low-noise amplifiers). The second RF chain may be communicatively coupled to a second antenna 514.

In some aspects, the UE may support two simultaneous uplink transmissions. For example, the first RF chain may support a first uplink transmission, and the second RF chain may support a second uplink transmission. The first RF chain may be associated with a first subscription, and the second RF chain may be associated with a second subscription. In some aspects, the baseband component may split resources between the first subscription and the second subscription. In some aspects, the RF components may be provisioned to support the two simultaneous uplink transmissions.

In some aspects, the first RF chain and the second RF chain may be associated with a same band (e.g., N78 band). In some aspects, the first RF chain and the second RF chain may be associated with different bands. Bands may be inter-frequency bands and/or intra-frequency bands. In some aspects, the first RF chain may be associated with FDD, and the second RF chain may be associated with FDD. In some aspects, the first RF chain may be associated with FDD, and the second RF chain may be associated with TDD (or vice versa). In some aspects, the first RF chain may be associated with TDD, and the second RF chain may be associated with TDD.

In some aspects, the baseband component in the UE may support uplink MIMO and/or uplink carrier aggregation. Uplink MIMO may support two uplink transmissions for one carrier. Uplink carrier aggregation may support one uplink transmission per carrier. The uplink MIMO and/or the uplink carrier aggregation may be configured to provide one uplink transmission per subscription (e.g., one uplink transmission may be dedicated per subscription). In other words, an uplink MIMO capability and/or an uplink carrier aggregation capability of the UE may enable simultaneous uplink transmissions for two separate subscriptions. Uplink carrier aggregation, which may support two or more uplink carriers, may be leveraged to support the simultaneous uplink transmissions for the two separate subscriptions. The simultaneous uplink transmissions may refer to "full concurrency" between the first subscription and the second subscription.

As indicated above, FIG. 5 is provided as an example. Other examples may differ from what is described with regard to FIG. 5.

Figure 6:
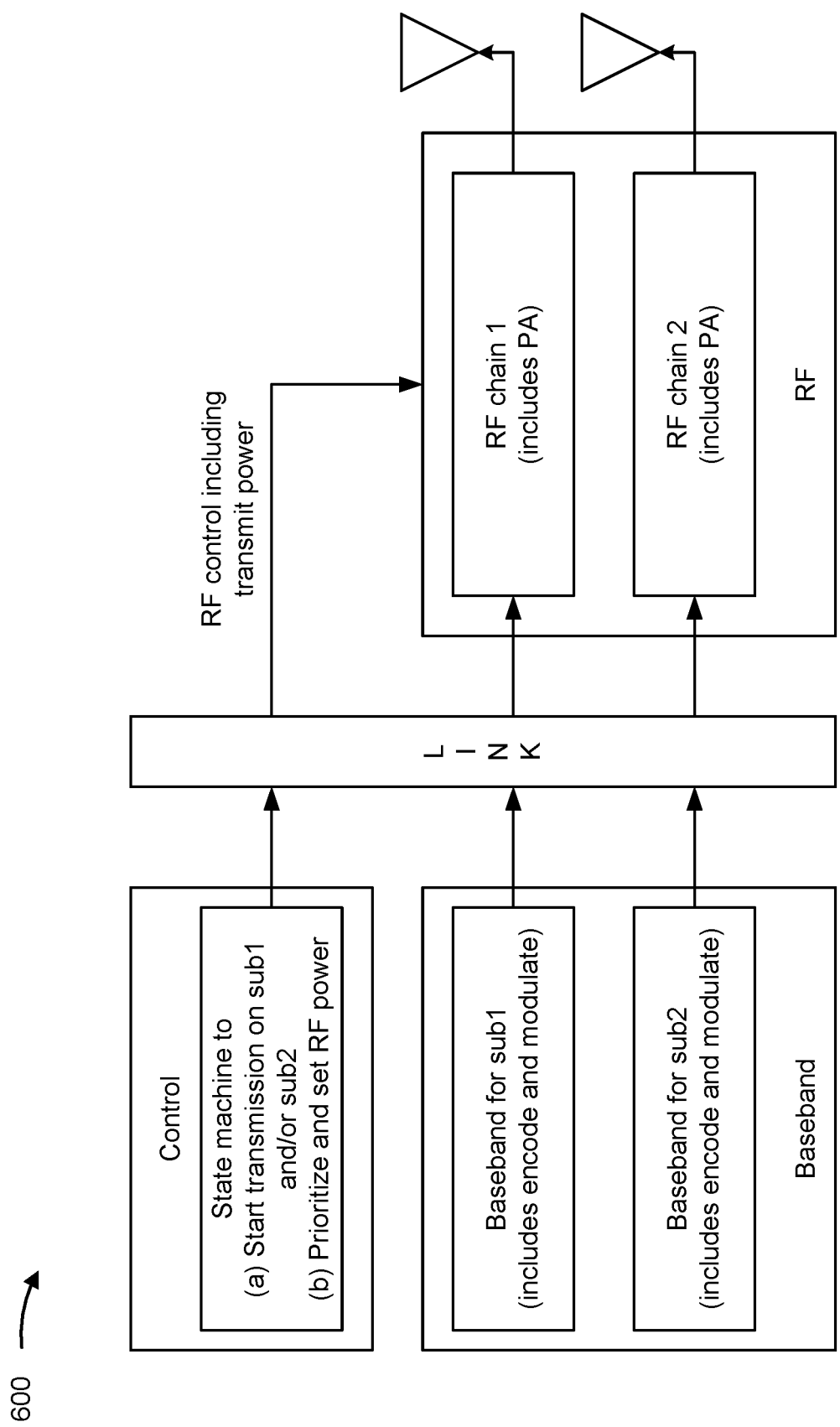

FIG. 6 is a diagram illustrating an example 600 of simultaneous uplink transmissions associated with multiple subscriptions, in accordance with the present disclosure.

As shown in FIG. 6, a UE may include a control component, a baseband component, an RF component, a link to the RF component, a first antenna, and a second antenna. The control component may be associated with a state machine to start an uplink transmission on a first subscription and/or to start an uplink transmission on a second subscription. The state machine may prioritize and set an RF power. In some aspects, the baseband component may include a first baseband component for the first subscription and a second baseband component for the second subscription. In some aspects, the RF component may include a first RF chain communicatively coupled to the first baseband component via a link, and a second RF chain communicatively coupled to the second baseband component via the link. The first RF chain may include a power amplifier, and the second RF chain may include a power amplifier. The RF component may receive RF control including a transmit power from the control component. The first RF chain may be communicatively coupled to a first antenna, and the second RF chain may be communicatively coupled to a second antenna.

In some aspects, the control component may start an uplink transmission on the first subscription and/or the second subscription. In some aspects, the control component may set an uplink transmission power for the first subscription and/or the second subscription.

In some aspects, the baseband component may perform encoding, and modulation and filtering. The baseband component may support two or more carriers in uplink carrier aggregation. The baseband component may perform encoding including low-density parity-check (LDPC) encoding for a PUSCH transmission and polar encoding for a physical uplink control channel (PUCCH) transmission. The baseband component may perform modulation including scrambling, interleaving, precoding, and/or mapping to a constellation (e.g., 16 quadrature amplitude modulation (16-QAM) or 64-QAM). In some aspects, two or more uplink carrier aggregation carriers may be time shared or independent hardware blocks. Further, the baseband component may provision two or more baseband uplink carriers for uplink carrier aggregation, which may be used to support simultaneous uplink transmissions at the UE (e.g., one uplink transmission per subscription).

In some aspects, the RF component may include the first RF chain and the second RF chain, which may include a plurality of RF components, such as filters, power amplifiers, and/or phase-locked loops. In some aspects, the first RF chain may be used for the first subscription, and the second RF chain may be used for the second subscription. In some aspects, the first RF chain may be associated with a first power amplifier, and the second RF chain may be associated with a second power amplifier.

In some aspects, to support simultaneous uplink transmissions at the UE, the baseband component may be provisioned for two or more uplink carriers. The RF component may be provisioned for two or more uplink carriers. The simultaneous uplink transmissions may be based at least in part on the first RF chain and the second RF chain, where no timing alignment may be between the first RF chain and the second RF chain. Further, the simultaneous uplink transmissions at the UE for two separate subscriptions may be transparent to the networks.

As indicated above, FIG. 6 is provided as an example. Other examples may differ from what is described with regard to FIG. 6.

Figure 7:
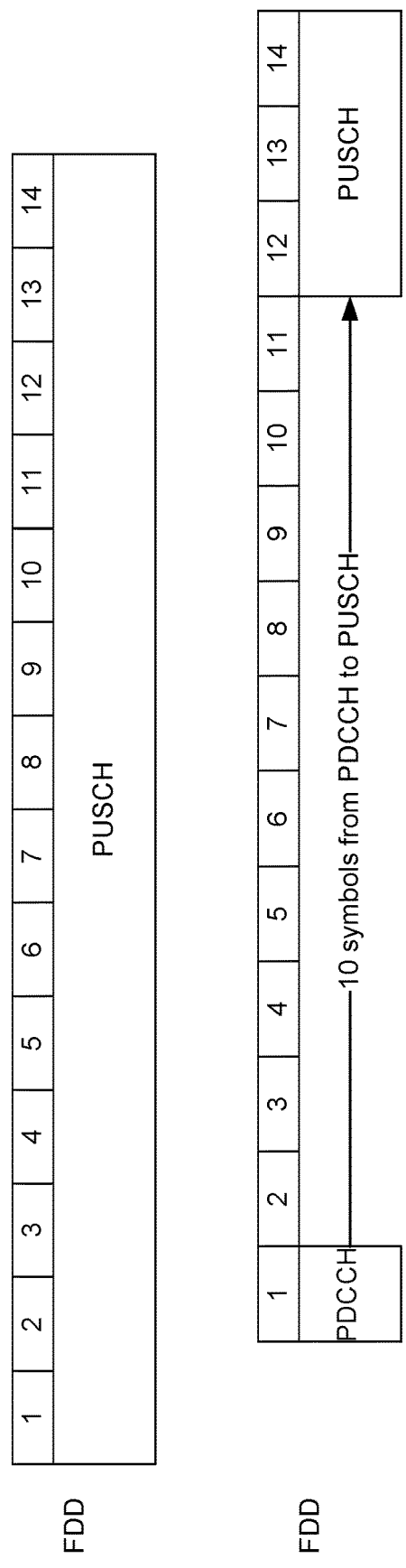

FIG. 7 is a diagram illustrating an example 700 of simultaneous uplink transmissions associated with multiple subscriptions, in accordance with the present disclosure.

As shown in FIG. 7, a first RF chain of a UE may perform the first uplink transmission based at least in part on FDD. The first RF chain may be associated with a first subscription. The first uplink transmission may be a PUSCH transmission. While the first uplink transmission is being performed, a second RF chain of the UE may receive a PDCCH. The second RF chain may be associated with a second subscription. The PDCCH may indicate a grant for a second uplink transmission, such as a PUSCH transmission. The second RF chain may perform the second uplink transmission after receiving the PDCCH. The second RF chain may perform the second uplink transmission based at least in part on FDD. A time duration between a receipt of the PDCCH and a start of the second uplink transmission (e.g., the PUSCH transmission) may be based at least in part on a minimum timeline for FDD (e.g., 10 symbols of approximately 714 microseconds (µs) in duration). The second RF chain may perform the second uplink transmission while the first RF chain is still performing the first uplink transmission. In other words, the first uplink transmission may partially overlap with the second uplink transmission based at least in part on a full concurrency capability of the UE.

As indicated above, FIG. 7 is provided as an example. Other examples may differ from what is described with regard to FIG. 7.

Figure 8:
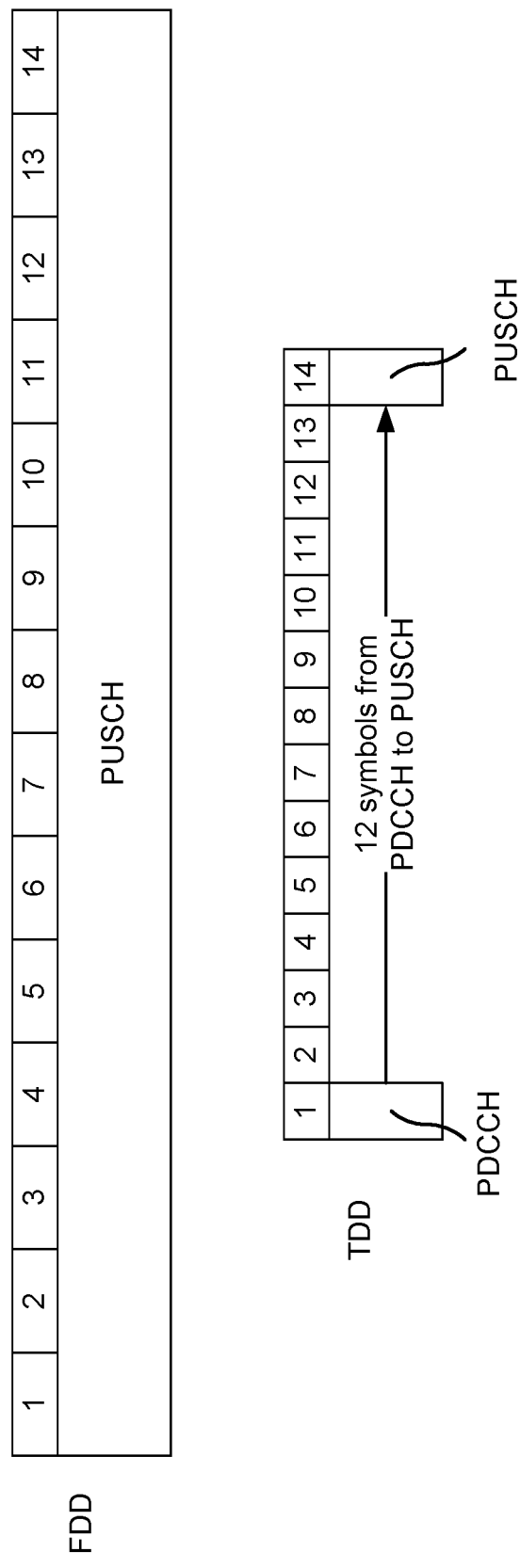

FIG. 8 is a diagram illustrating an example 800 of simultaneous uplink transmissions associated with multiple subscriptions, in accordance with the present disclosure.

As shown in FIG. 8, a first RF chain of a UE may perform the first uplink transmission based at least in part on FDD. The first RF chain may be associated with a first subscription. The first uplink transmission may be a PUSCH transmission. While the first uplink transmission is being performed, a second RF chain of the UE may receive a PDCCH. The second RF chain may be associated with a second subscription. The PDCCH may indicate a grant for a second uplink transmission, such as a PUSCH transmission. The second RF chain may perform the second uplink transmission after receiving the PDCCH. The second RF chain may perform the second uplink transmission based at least in part on TDD. A time duration between a receipt of the PDCCH and a start of the second uplink transmission (e.g., the PUSCH transmission) may be based at least in part on a minimum timeline for TDD (e.g., 12 symbols of approximately 428 µs in duration). The second RF chain may perform the second uplink transmission while the first RF chain is still performing the first uplink transmission.

As indicated above, FIG. 8 is provided as an example. Other examples may differ from what is described with regard to FIG. 8.

Figure 9:
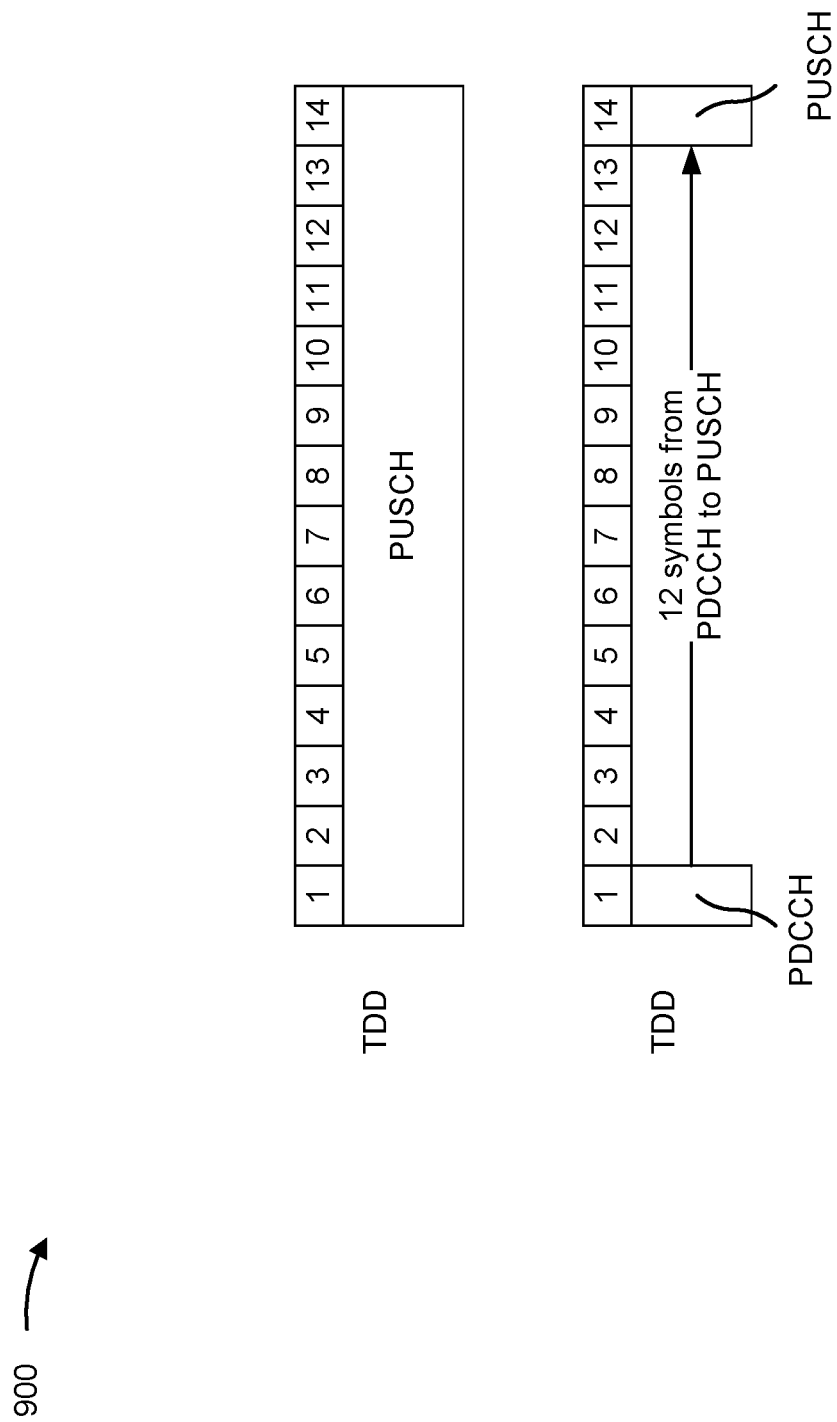

FIG. 9 is a diagram illustrating an example 900 of simultaneous uplink transmissions associated with multiple subscriptions, in accordance with the present disclosure.

As shown in FIG. 9, a first RF chain of a UE may perform the first uplink transmission based at least in part on TDD. The first RF chain may be associated with a first subscription. The first uplink transmission may be a PUSCH transmission. While the first uplink transmission is being performed, a second RF chain of the UE may receive a PDCCH. The second RF chain may be associated with a second subscription. The PDCCH may indicate a grant for a second uplink transmission, such as a PUSCH transmission. The second RF chain may perform the second uplink transmission after receiving the PDCCH. The second RF chain may perform the second uplink transmission based at least in part on TDD. A time duration between a receipt of the PDCCH and a start of the second uplink transmission (e.g., the PUSCH transmission) may be based at least in part on a minimum timeline for TDD (e.g., 12 symbols of approximately 428 µs in duration). The second RF chain may perform the second uplink transmission while the first RF chain is still performing the first uplink transmission.

As indicated above, FIG. 9 is provided as an example. Other examples may differ from what is described with regard to FIG. 9.

In some aspects, full concurrency between a first RF chain and a second RF chain may not be allowed due to RF conditions without adjusting a transmit power of the first RF chain and/or the second RF chain. For example, the first RF chain and/or the second RF chain may backoff the transmit power to prevent intermodulation from violating out-of-band emissions. In some aspects, the first RF chain and/or the second RF chain may apply transmit power backoff and muting to allow higher priority transmissions to be performed with full power or higher power, and lower priority transmissions may be performed with lower power or residual power. The power backoff may occur at a symbol level. In other words, the power backoff may involve symbol-by-symbol adjustments (e.g., a symbol spanning 35-70 us), as opposed to power backoff adjustments performed at a slot level (e.g., which may be one millisecond or more).

Figure 10:
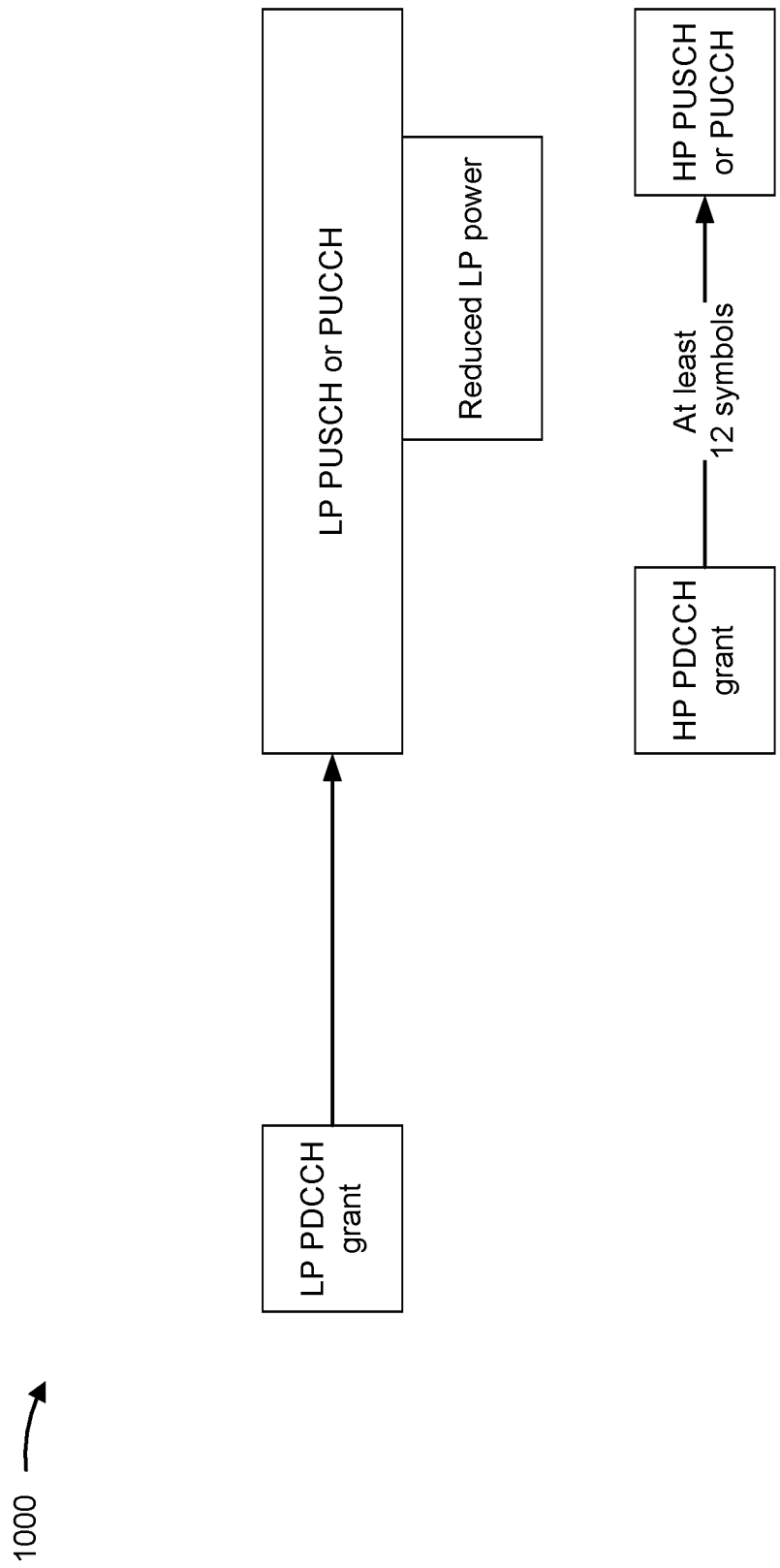

FIG. 10 is a diagram illustrating an example 1000 of simultaneous uplink transmissions associated with multiple subscriptions, in accordance with the present disclosure.

As shown in FIG. 10, a first RF chain of a UE may receive a low priority PDCCH grant. The first RF chain may perform a low priority transmission (e.g., a PUSCH transmission or a PUCCH transmission) based at least in part on the low priority PDCCH grant. After the first RF chain begins performing the low priority transmission, a second RF chain of the UE may receive a high priority PDCCH grant. The second RF chain may perform a high priority transmission (e.g., a PUSCH transmission or a PUCCH transmission) based at least in part on the high priority PDCCH grant. The second RF chain may perform the high priority transmission based at least in part on a time duration (e.g., 12 symbols) between a receipt of the high priority PDCCH grant and a start of the high priority transmission. In some aspects, the first RF chain may reduce a power of the low priority transmission before the second RF chain begins performing the high priority transmission. In other words, since the low priority transmission is of lower priority than the high priority transmission, the first RF chain may reduce the power of the low priority transmission, and the second RF chain may perform the high priority transmission at full power. The first RF chain and the second RF chain may still simultaneously perform the low priority transmission and the high priority transmission, respectively.

As indicated above, FIG. 10 is provided as an example. Other examples may differ from what is described with regard to FIG. 10.

In some aspects, a UE that supports two subscriptions may include two amplifiers (e.g., power amplifiers) for a given band. The two amplifiers may have a same maximum output power or a different maximum output power. For example, a first amplifier may have a same maximum output power as a second amplifier, or alternatively, the first amplifier may have a different maximum output power than the second amplifier.

In some aspects, when both a first subscription and a second subscription are not at an edge of coverage, or a transmit concurrency has a higher priority than maximizing an uplink power headroom, each subscription may be assigned to one amplifier. For example, the first amplifier may be assigned to the first subscription, and the second amplifier may be assigned to the second subscription.

In some aspects, the first amplifier and the second amplifier may have different maximum output powers. In some aspects, when the first subscription has a higher priority than the second subscription, the first subscription may be assigned an amplifier with a higher maximum output power, and the second subscription may be assigned an amplifier with a lower maximum output power. In some aspects, when the first subscription has a lower priority than the second subscription, the first subscription may be assigned an amplifier with a lower maximum output power, and the second subscription may be assigned an amplifier with a higher maximum output power. In some aspects, when the first amplifier and the second amplifier have a same maximum output power, the first subscription may be assigned one of the two amplifiers, and the second subscription may be assigned the other amplifier.

In some aspects, when any one of the first subscription or the second subscription are at an edge of coverage, or maximizing an uplink power headroom has a higher priority than a transmit concurrency, the two amplifiers may be used together at a same time by the first subscription or the second subscription at a given time. The first subscription and the second subscription may take turns in time to obtain access to both amplifiers to maximize the uplink power headroom/performance, and to avoid uplink-related call drops. In other words, the two amplifiers may be treated as a "two-tuple," and the UE may enter a "two-tuple transmit sharing" mode in which the first subscription and the second subscription take turns in time obtaining access to both of the amplifiers at a given time.

As an example, the first amplifier may have a maximum output power of +26 dBm, and the second amplifier may have a maximum output power of +26 dBm. When the first amplifier is combined with the second amplifier, a combined maximum output power of +29 dBm may be produced.

Figure 11:
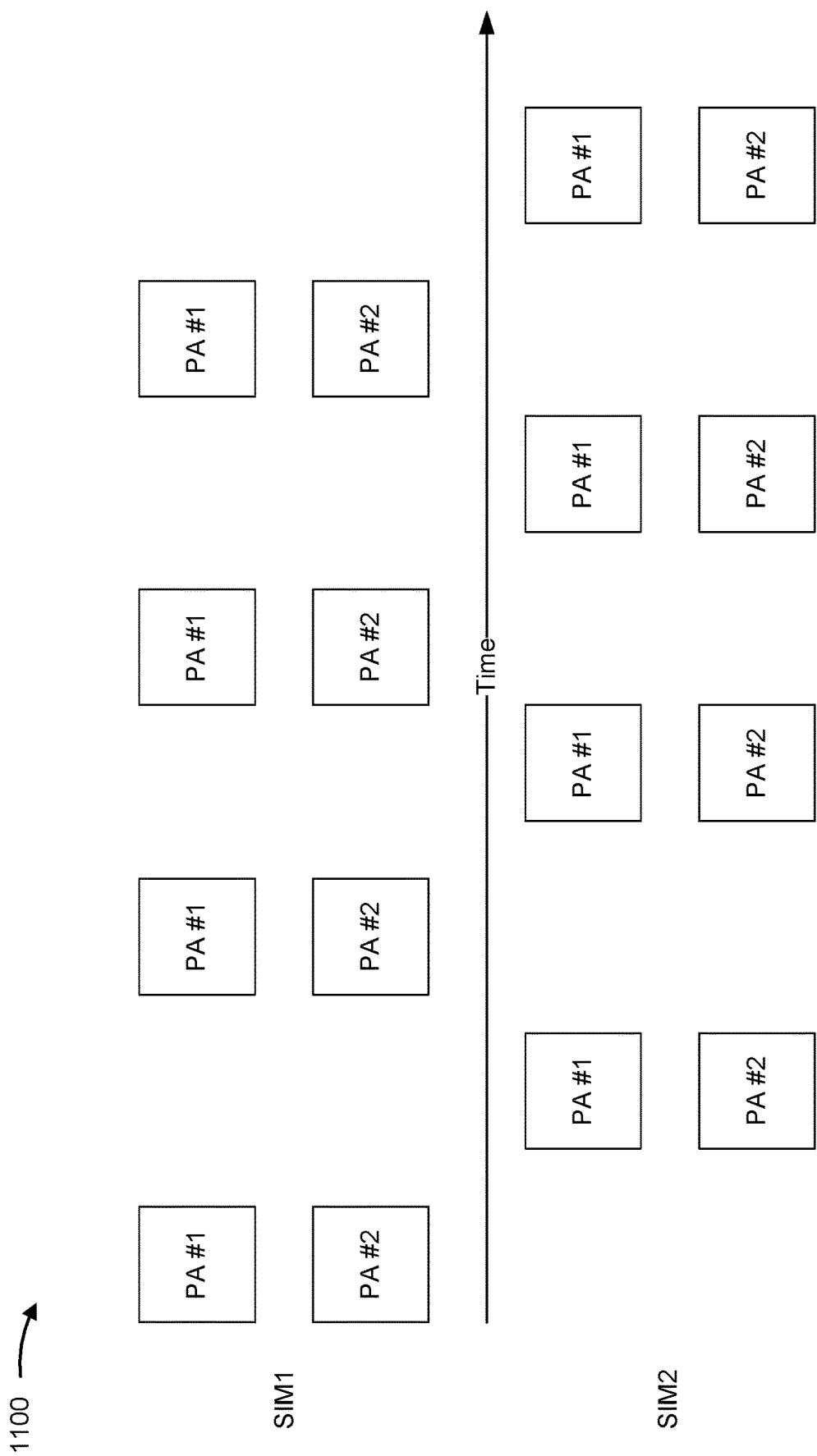

FIG. 11 is a diagram illustrating an example 1100 of simultaneous uplink transmissions associated with multiple subscriptions, in accordance with the present disclosure.

As shown in FIG. 11, a first subscription may obtain access to both a first amplifier and a second amplifier for a duration of time. The first subscription may use both the first amplifier and the second amplifier at a same time to produce an increased maximum output power, which may be useful when the first subscription and/or a second subscription are at an edge of coverage and/or an uplink power headroom/performance is to be maximized to avoid uplink-related call drops. Further, the second subscription may obtain access to both the first amplifier and the second amplifier for a later duration of time. As a result, the first subscription and the second subscription may alternative between using both the first amplifier and the second amplifier.

As indicated above, FIG. 11 is provided as an example. Other examples may differ from what is described with regard to FIG. 11.

Figure 12:
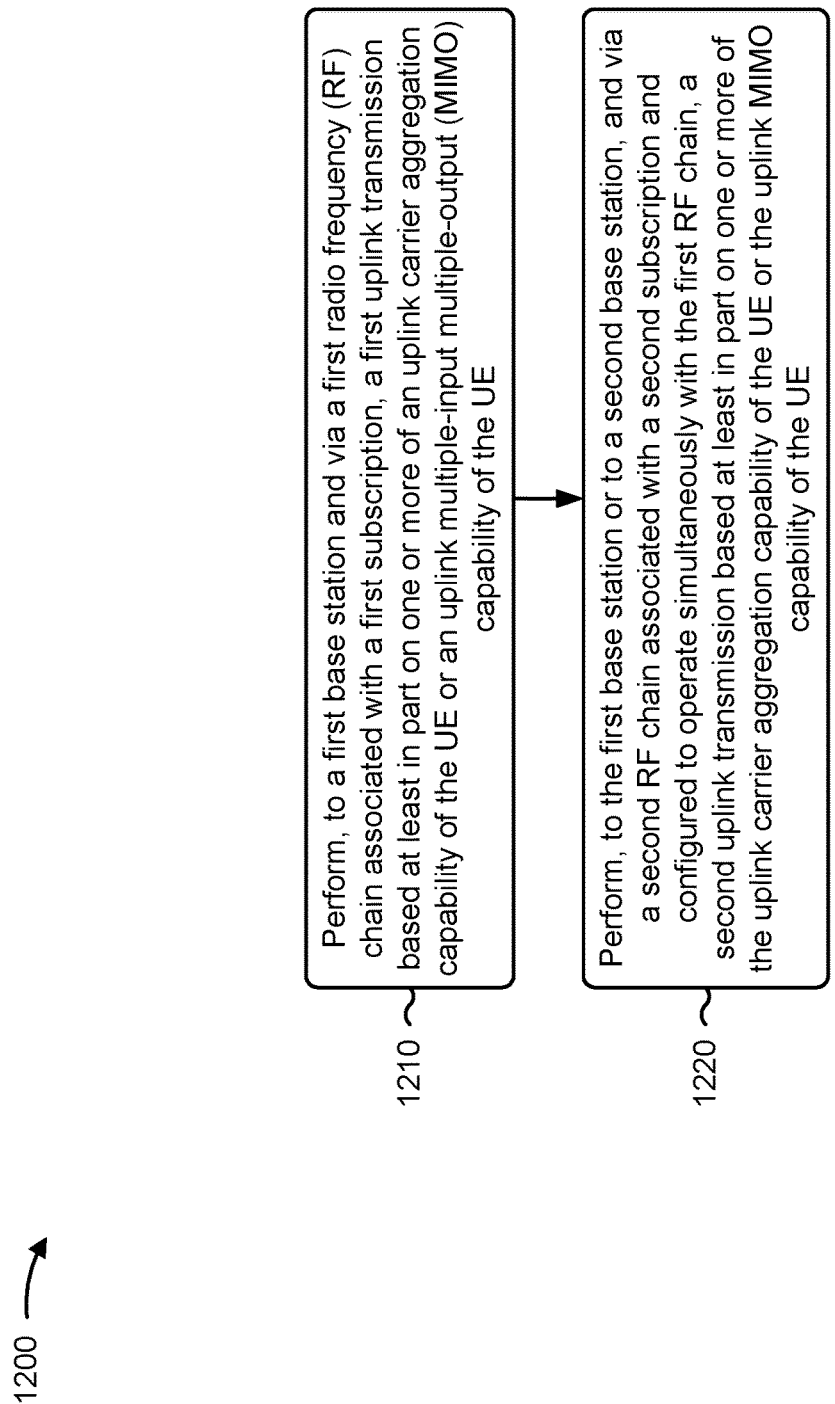
FIG. 12 is a diagram illustrating an example process associated with simultaneous uplink transmissions associated with multiple subscriptions, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with simultaneous uplink transmissions associated with multiple subscriptions.

As shown in FIG. 12, in some aspects, process 1200 may include performing, to a first base station and via a first RF chain associated with a first subscription, a first uplink transmission based at least in part on one or more of an uplink carrier aggregation capability of the UE or an uplink MIMO capability of the UE (block 1210). For example, the UE (e.g., using transmission component 1304, depicted in FIG. 13) may perform, to a first base station and via a first RF chain associated with a first subscription, a first uplink transmission based at least in part on one or more of an uplink carrier aggregation capability of the UE or an uplink MIMO capability of the UE, as described above.

As further shown in FIG. 12, in some aspects, process 1200 may include performing, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE (block 1220). For example, the UE (e.g., using transmission component 1304, depicted in FIG. 13) may perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE, as described above.

Process 1200 may include additional aspects, such as any single aspect or any combination of aspects described below and/or in connection with one or more other processes described elsewhere herein.

In a first aspect, the uplink carrier aggregation capability supports one transmission per carrier and is configured to provide one uplink transmission per subscription.

In a second aspect, alone or in combination with the first aspect, the uplink carrier aggregation capability of the UE is based at least in part on a baseband, and on the first RF chain and the second RF chain being provisioned for two or more uplink carriers, and wherein the baseband provisions a first uplink carrier for the first RF chain and a second uplink carrier for the second RF chain.

In a third aspect, the uplink MIMO capability supports two transmissions for one carrier and is configured to provide one uplink transmission per subscription.

In a fourth aspect, alone or in combination with one or more of the first through third aspects, the first base station is associated with a first network and the second base station is associated with a second network.

In a fifth aspect, alone or in combination with one or more of the first through fourth aspects, the first subscription and the second subscription are associated with a single band.

In a sixth aspect, alone or in combination with one or more of the first through fifth aspects, the first subscription is associated with a first band and the second subscription is associated with a second band.

In a seventh aspect, alone or in combination with one or more of the first through sixth aspects, the first uplink transmission at least partially overlaps with the second uplink transmission.

In an eighth aspect, alone or in combination with one or more of the first through seventh aspects, the first uplink transmission is based at least in part on frequency division duplexing and the second uplink transmission is based at least in part on frequency division duplexing.

In a ninth aspect, alone or in combination with one or more of the first through eighth aspects, the first uplink transmission is based at least in part on frequency division duplexing and the second uplink transmission is based at least in part on time division duplexing.

In a tenth aspect, alone or in combination with one or more of the first through ninth aspects, the first uplink transmission is based at least in part on time division duplexing and the second uplink transmission is based at least in part on time division duplexing.

In an eleventh aspect, alone or in combination with one or more of the first through tenth aspects, the first uplink transmission and the second uplink transmission are associated with physical uplink shared channel transmissions.

In a twelfth aspect, alone or in combination with one or more of the first through eleventh aspects, the first RF chain is not time aligned with the second RF chain.

In a thirteenth aspect, alone or in combination with one or more of the first through twelfth aspects, process 1200 includes receiving, from a first base station via the first RF chain, a first PDCCH grant associated with a first priority, wherein the first PDCCH grant is associated with the first uplink transmission, receiving, from the first base station or a second base station and via the second RF chain, a second PDCCH grant associated with a second priority that is higher than the first priority, wherein the second PDCCH grant is associated with the second uplink transmission, and reducing a power level associated with the first uplink transmission and increasing a power level associated with the second uplink transmission based at least in part on the second priority being higher than the first priority.

In a fourteenth aspect, alone or in combination with one or more of the first through thirteenth aspects, the power level associated with the first uplink transmission is reduced on a per symbol level.

In a fifteenth aspect, alone or in combination with one or more of the first through fourteenth aspects, process 1200 includes assigning a first amplifier associated with the first RF chain to the first subscription and assigning a second amplifier associated with the second RF chain to the second subscription based at least in part on the first subscription and the second subscription not being at an edge of coverage.

In a sixteenth aspect, alone or in combination with one or more of the first through fifteenth aspects, process 1200 includes assigning a first amplifier associated with the first RF chain to the first subscription and assigning a second amplifier associated with the second RF chain to the second subscription based at least in part on an uplink transmit concurrency having a higher priority than maximizing an uplink power headroom.

In a seventeenth aspect, alone or in combination with one or more of the first through sixteenth aspects, process 1200 includes assigning a first amplifier associated with the first RF chain to the first subscription and assigning a second amplifier associated with the second RF chain to the second subscription based at least in part on a priority of the first subscription in relation to a priority of the second subscription, wherein the first amplifier is associated with a first maximum output power and the second amplifier is associated with a second maximum output power.

In an eighteenth aspect, alone or in combination with one or more of the first through seventeenth aspects, process 1200 includes assigning a first amplifier associated with the first RF chain and a second amplifier associated with the second RF chain to one of the first subscription or the second subscription for a period of time based at least in part on one or more of the first subscription or the second subscription being at an edge of coverage.

In a nineteenth aspect, alone or in combination with one or more of the first through eighteenth aspects, process 1200 includes assigning a first amplifier associated with the first RF chain and a second amplifier associated with the second RF chain to one of the first subscription or the second subscription for a period of time when maximizing an uplink power headroom has a higher priority than an uplink transmit concurrency.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
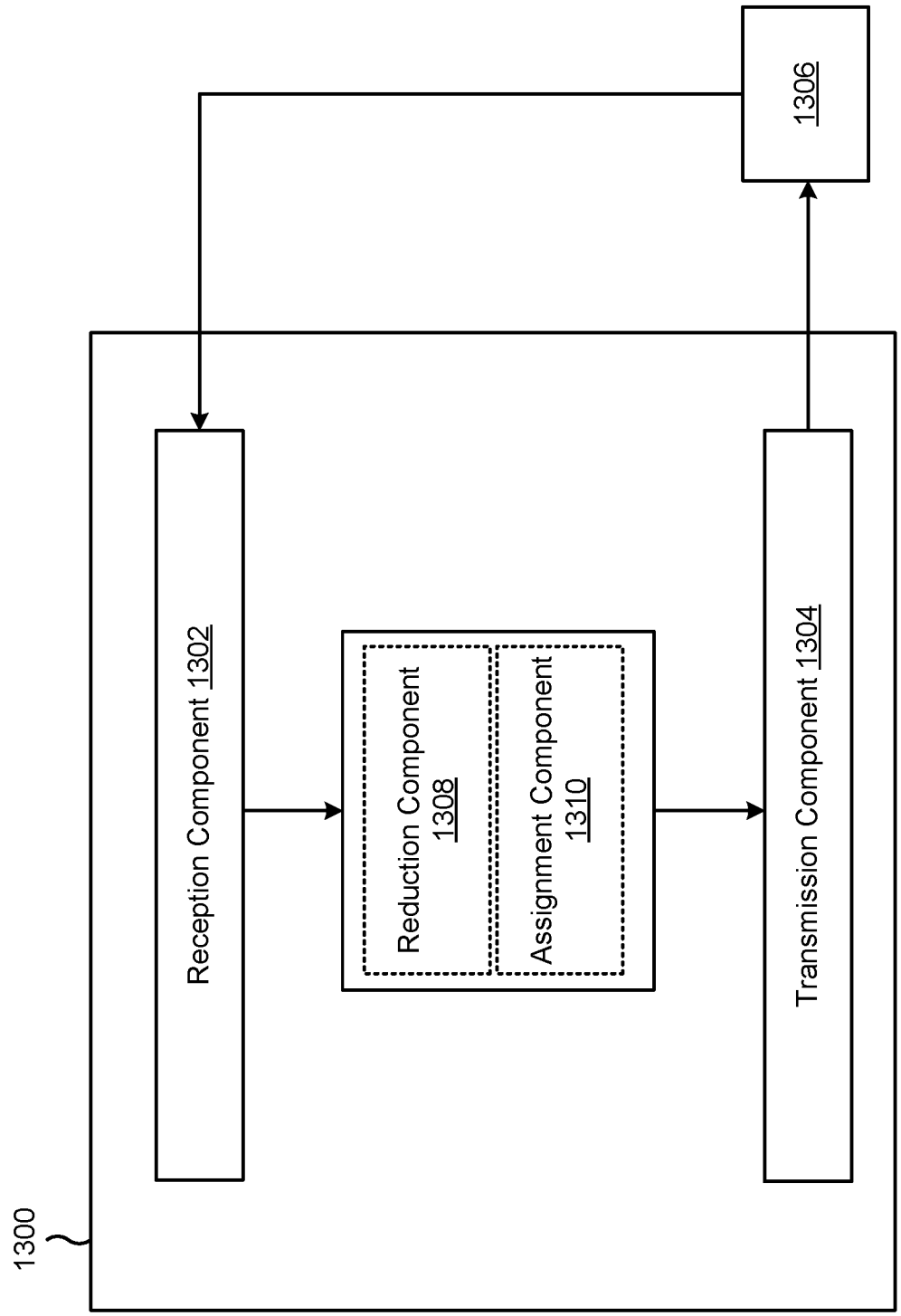
FIG. 13 is a block diagram of an example apparatus for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a reduction component 1308 or an assignment component 1310, among other examples.

In some aspects, the apparatus 1300 may be configured to perform one or more operations described herein in connection with FIGS. 3-11. Additionally, or alternatively, the apparatus 1300 may be configured to perform one or more processes described herein, such as process 1200 of FIG. 12. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The transmission component 1304 may perform, to a first base station and via a first RF chain associated with a first subscription, a first uplink transmission based at least in part on one or more of an uplink carrier aggregation capability of the UE or an uplink MIMO capability of the UE. The transmission component 1304 may perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

The reception component 1302 may receive, from a first base station via the first RF chain, a first PDCCH grant associated with a first priority, wherein the first PDCCH grant is associated with the first uplink transmission. The reception component 1302 may receive, from the first base station or a second base station and via the second RF chain, a second PDCCH grant associated with a second priority that is higher than the first priority, wherein the second PDCCH grant is associated with the second uplink transmission.

The reduction component 1308 may reduce a power level associated with the first uplink transmission and increasing a power level associated with the second uplink transmission based at least in part on the second priority being higher than the first priority.

The assignment component 1310 may assign a first amplifier associated with the first RF chain to the first subscription and assigning a second amplifier associated with the second RF chain to the second subscription based at least in part on the first subscription and the second subscription not being at an edge of coverage. The assignment component 1310 may assign a first amplifier associated with the first RF chain to the first subscription and assigning a second amplifier associated with the second RF chain to the second subscription based at least in part on an uplink transmit concurrency having a higher priority than maximizing an uplink power headroom.

The assignment component 1310 may assign a first amplifier associated with the first RF chain to the first subscription and assigning a second amplifier associated with the second RF chain to the second subscription based at least in part on a priority of the first subscription in relation to a priority of the second subscription, wherein the first amplifier is associated with a first maximum output power and the second amplifier is associated with a second maximum output power.

The assignment component 1310 may assign a first amplifier associated with the first RF chain and a second amplifier associated with the second RF chain to one of the first subscription or the second subscription for a period of time based at least in part on one or more of the first subscription or the second subscription being at an edge of coverage. The assignment component 1310 may assign a first amplifier associated with the first RF chain and a second amplifier associated with the second RF chain to one of the first subscription or the second subscription for a period of time when maximizing an uplink power headroom has a higher priority than an uplink transmit concurrency.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: performing, to a first base station and via a first radio frequency (RF) chain associated with a first subscription, a first uplink transmission based at least in part on one or more of an uplink carrier aggregation capability of the UE or an uplink multiple-input multiple-output (MIMO) capability of the UE; and performing, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

Aspect 2: The method of Aspect 1, wherein the uplink carrier aggregation capability supports one transmission per carrier and is configured to provide one uplink transmission per subscription.

Aspect 3: The method of Aspect 1, wherein the uplink carrier aggregation capability of the UE is based at least in part on a baseband, and on the first RF chain and the second RF chain being provisioned for two or more uplink carriers, and wherein the baseband provisions a first uplink carrier for the first RF chain and a second uplink carrier for the second RF chain.

Aspect 4: The method of any of Aspects 1 through 3, wherein the uplink MIMO capability supports two transmissions for one carrier and is configured to provide one uplink transmission per subscription.

Aspect 5: The method of any of Aspects 1 through 4, wherein the first base station is associated with a first network and the second base station is associated with a second network.

Aspect 6: The method of any of Aspects 1 through 5, wherein the first subscription and the second subscription are associated with a single band.

Aspect 7: The method of any of Aspects 1 through 6, wherein the first subscription is associated with a first band and the second subscription is associated with a second band.

Aspect 8: The method of any of Aspects 1 through 7, wherein the first uplink transmission at least partially overlaps with the second uplink transmission.

Aspect 9: The method of any of Aspects 1 through 8, wherein the first uplink transmission is based at least in part on frequency division duplexing and the second uplink transmission is based at least in part on frequency division duplexing.

Aspect 10: The method of any of Aspects 1 through 9, wherein the first uplink transmission is based at least in part on frequency division duplexing and the second uplink transmission is based at least in part on time division duplexing.

Aspect 11: The method of any of Aspects 1 through 10, wherein the first uplink transmission is based at least in part on time division duplexing and the second uplink transmission is based at least in part on time division duplexing.

Aspect 12: The method of any of Aspects 1 through 11, wherein the first uplink transmission and the second uplink transmission are associated with physical uplink shared channel transmissions.

Aspect 13: The method of any of Aspects 1 through 12, wherein the first RF chain is not time aligned with the second RF chain.

Aspect 14: The method of any of Aspects 1 through 13, further comprising: receiving, from a first base station via the first RF chain, a first physical downlink control channel (PDCCH) grant associated with a first priority, wherein the first PDCCH grant is associated with the first uplink transmission; receiving, from the first base station or a second base station and via the second RF chain, a second PDCCH grant associated with a second priority that is higher than the first priority, wherein the second PDCCH grant is associated with the second uplink transmission; and reducing a power level associated with the first uplink transmission and increasing a power level associated with the second uplink transmission based at least in part on the second priority being higher than the first priority.

Aspect 15: The method of Aspect 14, wherein the power level associated with the first uplink transmission is reduced on a per symbol level.

Aspect 16: The method of any of Aspects 1 through 15, further comprising: assigning a first amplifier associated with the first RF chain to the first subscription and assigning a second amplifier associated with the second RF chain to the second subscription based at least in part on the first subscription and the second subscription not being at an edge of coverage.

Aspect 17: The method of any of Aspects 1 through 16, further comprising: assigning a first amplifier associated with the first RF chain to the first subscription and assigning a second amplifier associated with the second RF chain to the second subscription based at least in part on an uplink transmit concurrency having a higher priority than maximizing an uplink power headroom.

Aspect 18: The method of any of Aspects 1 through 17, further comprising: assigning a first amplifier associated with the first RF chain to the first subscription and assigning a second amplifier associated with the second RF chain to the second subscription based at least in part on a priority of the first subscription in relation to a priority of the second subscription, wherein the first amplifier is associated with a first maximum output power and the second amplifier is associated with a second maximum output power.

Aspect 19: The method of any of Aspects 1 through 18, further comprising: assigning a first amplifier associated with the first RF chain and a second amplifier associated with the second RF chain to one of the first subscription or the second subscription for a period of time based at least in part on one or more of the first subscription or the second subscription being at an edge of coverage.

Aspect 20: The method of any of Aspects 1 through 19, further comprising: assigning a first amplifier associated with the first RF chain and a second amplifier associated with the second RF chain to one of the first subscription or the second subscription for a period of time when maximizing an uplink power headroom has a higher priority than an uplink transmit concurrency.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   perform, to a first base station and via a first radio frequency (RF) chain associated with a first subscription, a first uplink transmission based at least in part on one or more of an uplink carrier aggregation capability of the UE or an uplink multiple-input multiple-output (MIMO) capability of the UE; and
   perform, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

2. The UE of claim 1, wherein the uplink carrier aggregation capability supports one transmission per carrier and is configured to provide one uplink transmission per subscription.

3. The UE of claim 1, wherein the uplink carrier aggregation capability of the UE is based at least in part on a baseband, and on the first RF chain and the second RF chain being provisioned for two or more uplink carriers, and wherein the baseband provisions a first uplink carrier for the first RF chain and a second uplink carrier for the second RF chain.

4. The UE of claim 1, wherein the uplink MIMO capability supports two transmissions for one carrier and is configured to provide one uplink transmission per subscription.

5. The UE of claim 1, wherein the first base station is associated with a first network and the second base station is associated with a second network.

6. The UE of claim 1, wherein the first subscription and the second subscription are associated with a single band.

7. The UE of claim 1, wherein the first subscription is associated with a first band and the second subscription is associated with a second band.

8. The UE of claim 1, wherein the first uplink transmission at least partially overlaps with the second uplink transmission.

9. The UE of claim 1, wherein the first uplink transmission is based at least in part on frequency division duplexing and the second uplink transmission is based at least in part on frequency division duplexing.

10. The UE of claim 1, wherein the first uplink transmission is based at least in part on frequency division duplexing and the second uplink transmission is based at least in part on time division duplexing.

11. The UE of claim 1, wherein the first uplink transmission is based at least in part on time division duplexing and the second uplink transmission is based at least in part on time division duplexing.

12. The UE of claim 1, wherein the first uplink transmission and the second uplink transmission are associated with physical uplink shared channel transmissions.

13. The UE of claim 1, wherein the first RF chain is not time aligned with the second RF chain.

14. The UE of claim 1, wherein the one or more processors are further configured to:
   receive, from the first base station via the first RF chain, a first physical downlink control channel (PDCCH) grant associated with a first priority, wherein the first PDCCH grant is associated with the first uplink transmission;
   receive, from the first base station or the second base station and via the second RF chain, a second PDCCH grant associated with a second priority that is higher than the first priority, wherein the second PDCCH grant is associated with the second uplink transmission; and
   reduce a power level associated with the first uplink transmission and increase a power level associated with the second uplink transmission based at least in part on the second priority being higher than the first priority.

15. The UE of claim 14, wherein the power level associated with the first uplink transmission is reduced on a per symbol level.

16. The UE of claim 1, wherein the one or more processors are further configured to:
   assign a first amplifier associated with the first RF chain to the first subscription and assign a second amplifier associated with the second RF chain to the second subscription based at least in part on the first subscription and the second subscription not being at an edge of coverage.

17. The UE of claim 1, wherein the one or more processors are further configured to:
   assign a first amplifier associated with the first RF chain to the first subscription and assign a second amplifier associated with the second RF chain to the second subscription based at least in part on an uplink transmit concurrency having a higher priority than maximizing an uplink power headroom.

18. The UE of claim 1, wherein the one or more processors are further configured to:
assign a first amplifier associated with the first RF chain to the first subscription and assign a second amplifier associated with the second RF chain to the second subscription based at least in part on a priority of the first subscription in relation to a priority of the second subscription, wherein the first amplifier is associated with a first maximum output power and the second amplifier is associated with a second maximum output power.

19. The UE of claim 1, wherein the one or more processors are further configured to:
assign a first amplifier associated with the first RF chain and a second amplifier associated with the second RF chain to one of the first subscription or the second subscription for a period of time based at least in part on one or more of the first subscription or the second subscription being at an edge of coverage.

20. The UE of claim 1, wherein the one or more processors are further configured to:
assign a first amplifier associated with the first RF chain and a second amplifier associated with the second RF chain to one of the first subscription or the second subscription for a period of time when maximizing an uplink power headroom has a higher priority than an uplink transmit concurrency.

21. A method of wireless communication performed by a user equipment (UE), comprising:
performing, to a first base station and via a first radio frequency (RF) chain associated with a first subscription, a first uplink transmission based at least in part on one or more of an uplink carrier aggregation capability of the UE or an uplink multiple-input multiple-output (MIMO) capability of the UE; and
performing, to the first base station or to a second base station, and via a second RF chain associated with a second subscription and configured to operate simultaneously with the first RF chain, a second uplink transmission based at least in part on one or more of the uplink carrier aggregation capability of the UE or the uplink MIMO capability of the UE.

22. The method of claim 21, wherein the uplink carrier aggregation capability supports one transmission per carrier and is configured to provide one uplink transmission per subscription.

23. The method of claim 21, wherein the uplink carrier aggregation capability of the UE is based at least in part on a baseband, and on the first RF chain and the second RF chain being provisioned for two or more uplink carriers, and wherein the baseband provisions a first uplink carrier for the first RF chain and a second uplink carrier for the second RF chain.

24. The method of claim 21, wherein the uplink MIMO capability supports two transmissions for one carrier and is configured to provide one uplink transmission per subscription.

25. The method of claim 21, wherein the first uplink transmission at least partially overlaps with the second uplink transmission.

26. The method of claim 21, wherein:
the first uplink transmission is based at least in part on frequency division duplexing and the second uplink transmission is based at least in part on frequency division duplexing;
the first uplink transmission is based at least in part on frequency division duplexing and the second uplink transmission is based at least in part on time division duplexing; or
the first uplink transmission is based at least in part on time division duplexing and the second uplink transmission is based at least in part on time division duplexing.

27. The method of claim 21, wherein the first RF chain is not time aligned with the second RF chain.

28. The method of claim 21, further comprising:
receiving, from the first base station via the first RF chain, a first physical downlink control channel (PDCCH) grant associated with a first priority, wherein the first PDCCH grant is associated with the first uplink transmission;
receiving, from the first base station or the second base station and via the second RF chain, a second PDCCH grant associated with a second priority that is higher than the first priority, wherein the second PDCCH grant is associated with the second uplink transmission; and
reducing a power level associated with the first uplink transmission and increasing a power level associated with the second uplink transmission based at least in part on the second priority being higher than the first priority, wherein the power level associated with the first uplink transmission is reduced on a per symbol level.

29. An apparatus for wireless communication, comprising:
means for performing, to a first base station and via a first radio frequency (RF) chain associated with a first subscription, a first uplink transmission based at least in part on one or more of an uplink carrier aggregation capability of the apparatus or an uplink multiple-input multiple-output (MIMO) capability of the apparatus; and
means for performing, to the first base station or to a second base station, and via a second RF chain associated with a second subscription and configured to operate simultaneously with the first RF chain, a second uplink transmission based at least in part on one or more of the uplink carrier aggregation capability of the apparatus or the uplink MIMO capability of the apparatus.

* * * * *